US010750721B2

(12) United States Patent
Morin

(10) Patent No.: US 10,750,721 B2
(45) Date of Patent: Aug. 25, 2020

(54) COMBINATION POWER PACK RETRACTABLE LEASH AND COLLAR HAVING ELECTRONIC CHARGING, ELECTRONIC ANIMAL KEEPER, AND OUTDOOR SOLAR POWERED CHARGING STATION

(71) Applicant: Mario Morin, Saint-Wenceslas (CA)

(72) Inventor: Mario Morin, Saint-Wenceslas (CA)

( * ) Notice: Subject to any disclaimer, the term of this patent is extended or adjusted under 35 U.S.C. 154(b) by 290 days.

(21) Appl. No.: 15/749,782

(22) PCT Filed: Aug. 18, 2016

(86) PCT No.: PCT/CA2016/000212
§ 371 (c)(1),
(2) Date: Feb. 2, 2018

(87) PCT Pub. No.: WO2017/027959
PCT Pub. Date: Feb. 23, 2017

(65) Prior Publication Data
US 2020/0085018 A1 Mar. 19, 2020

(30) Foreign Application Priority Data
Aug. 19, 2015 (GB) .................................. 1514775.4

(51) Int. Cl.
*A01K 27/00* (2006.01)
*H02J 50/10* (2016.01)
(Continued)

(52) U.S. Cl.
CPC .......... *A01K 27/006* (2013.01); *A01K 27/004* (2013.01); *A01K 27/009* (2013.01);
(Continued)

(58) Field of Classification Search
CPC .... A01K 27/006; A01K 27/009; A01K 27/00; A01K 27/004
(Continued)

(56) References Cited

U.S. PATENT DOCUMENTS 3,099,250 A * 7/1963 Soles, Jr. ............. A01K 27/005
119/776
3,540,089 A * 11/1970 Franklin .............. A01K 27/005
24/602
(Continued)

OTHER PUBLICATIONS

U.S. Appl. No. 10/175,162, filed Aug. 24, 1999, Walter, Beck, Harting, Marsden.

*Primary Examiner* — Magdalena Topolski
*Assistant Examiner* — Kevin M Dennis

(57) ABSTRACT

A combination of a power pack electronic retractable leash, and a collar comprised of electronic components for tracking an animal wearing the collar; the retractable leash has a casing comprised of a spool located therein and which collects a leash line when the leash line is retracted; a power pack and related electronic PCB for power management; the leash line has its distal end terminated with a leash socket configured and sized for fitting into a socket connector; the leash socket is equipped with an emitting induction coil and the socket connector on the collar is equipped with a receiving induction coil; when the leash socket is connected to the socket connector, both the emitting and receiving induction coils are positioned proximal to one another so that electrical current can circulates between them so that electricity from the retractable leash battery can charge the battery located on the collar.

1 Claim, 18 Drawing Sheets

(51) Int. Cl.
*H02J 7/02* (2016.01)
*H02J 7/35* (2006.01)

(52) U.S. Cl.
CPC .............. *H02J 7/025* (2013.01); *H02J 7/35* (2013.01); *H02J 50/10* (2016.02)

(58) Field of Classification Search
USPC ....................................................... 119/719
See application file for complete search history.

(56) References Cited

U.S. PATENT DOCUMENTS

| | | | | |
|---|---|---|---|---|
| 4,018,189 A * | 4/1977 | Umphries | ............ | A01K 27/004 119/794 |
| 4,404,714 A * | 9/1983 | Duran | ................... | F16B 21/165 24/652 |
| 4,539,937 A * | 9/1985 | Workman | ............ | A01K 15/021 119/821 |
| 4,541,364 A * | 9/1985 | Contello | .............. | A01K 27/005 119/772 |
| 5,762,029 A * | 6/1998 | DuBois | ................ | A01K 27/004 119/796 |
| 6,247,427 B1 * | 6/2001 | DeBien | ................ | A01K 27/004 119/776 |
| 6,327,999 B1 * | 12/2001 | Gerig | ................... | A01K 15/021 119/712 |
| 6,379,072 B1 * | 4/2002 | Brown | ................. | B29C 45/1775 403/31 |
| 6,694,922 B2 * | 2/2004 | Walter | ................. | A01K 27/004 119/772 |
| 7,640,639 B2 * | 1/2010 | de Bien | ............... | A01K 27/005 119/772 |
| 7,954,211 B2 * | 6/2011 | De Bien | .............. | A01K 27/005 24/303 |
| D651,366 S * | 12/2011 | Fisher | ......................... | D30/153 |
| 8,220,116 B2 * | 7/2012 | Schwab | ............... | A44C 5/2057 24/572.1 |
| 8,327,808 B2 * | 12/2012 | Chirico | ................ | A01K 27/003 119/792 |
| 8,448,606 B2 * | 5/2013 | Yackley | .................... | A01K 1/04 119/721 |
| 8,763,563 B2 * | 7/2014 | Thalmann | ............ | A01K 15/029 119/792 |
| 9,480,241 B2 * | 11/2016 | Holmstrom | .......... | A01K 27/004 |
| 10,172,327 B2 * | 1/2019 | Holmstrom | .......... | A01K 27/004 |
| 10,178,855 B2 * | 1/2019 | Holmstrom | .......... | A01K 27/004 |
| 2001/0004238 A1 * | 6/2001 | Gerig | .................... | A01K 15/021 340/573.3 |
| 2003/0029388 A1 * | 2/2003 | Walter | ................. | A01K 27/004 119/772 |
| 2003/0094145 A1 * | 5/2003 | Cheng | ................. | A01K 27/006 119/859 |
| 2007/0107668 A1 * | 5/2007 | Eaton | .................... | A01K 11/008 119/719 |
| 2007/0107669 A1 * | 5/2007 | Eaton | .................... | A01K 27/009 119/792 |
| 2008/0223308 A1 * | 9/2008 | Stern | ..................... | A01K 27/004 119/720 |
| 2008/0314336 A1 * | 12/2008 | Church | ................. | A01K 1/0236 119/771 |
| 2016/0050890 A1 * | 2/2016 | Fitzgerald | ............ | A01K 29/005 119/795 |
| 2016/0135431 A1 * | 5/2016 | Sheldon | ................ | H02J 7/0047 119/859 |
| 2017/0000088 A1 * | 1/2017 | Smith | .................... | A01K 27/004 |
| 2017/0071162 A1 * | 3/2017 | Holmstrom | .......... | A01K 27/004 |
| 2017/0079246 A1 * | 3/2017 | Holmstrom | .......... | A01K 27/004 |
| 2017/0095206 A1 * | 4/2017 | Leib | ....................... | G16H 40/63 |

* cited by examiner

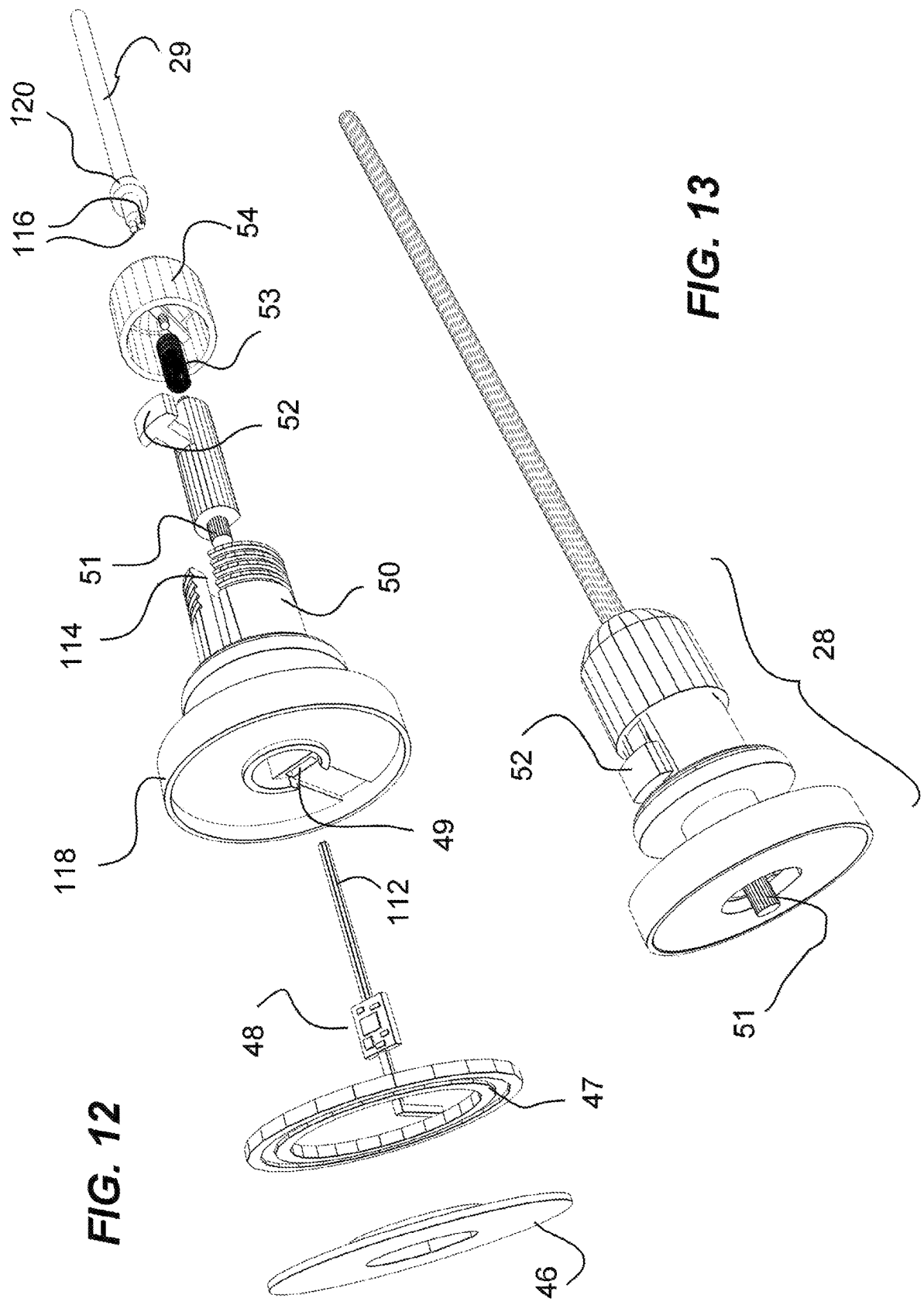

122

COMBINATION POWER PACK RETRACTABLE LEASH AND COLLAR HAVING ELECTRONIC CHARGING, ELECTRONIC ANIMAL KEEPER, AND OUTDOOR SOLAR POWERED CHARGING STATION

FIELD OF THE INVENTION

The present invention relates generally to dog collars and leashes but more particularly to a combination power pack retractable leash and collar having electronic charging, electronic animal keeper, and outdoor solar powered charging station.

BACKGROUND OF THE INVENTION

First came GPS, cell phone enabled devices so that parents could easily locate their children, then came similar devices for pets. One problem is that the electronics in GPS equipped collars use battery power and if the power is out when the dog is astray, the device is not of much use. Other inconveniences arise it is complicated to recharge those collars.

SUMMARY OF THE INVENTION

In view of the foregoing disadvantages inherent in the known devices now present in the prior art, the present invention, which will be described subsequently in greater detail, is to provide objects and advantages which are:

To provide for a combination power pack retractable leash and collar having electronic charging, electronic animal keeper, and outdoor solar powered charging station.

In order to do so, the invention comprises three major components:

1) An electronic collar animal keeper, cellular and GPS plotter, is charged by internal induction charging coil which allows reception of load current through the housing. Inside the collar are SIM card to call the collar, a GPS, a control circuit with embedded memory that manages other functions of cellular and GPS, and all functions such as necklace display, power consumption, transmission functions without wire, GPS antenna, cellular antenna, receiving antenna chip controlling the vibrator motor. GPS programming delimitation of territory. The control circuit is coupled to the cellular GPS system and makes managing and editing features of the collar settings via a mobile application. In the center, just above the connector connection space, is the 3.7V lithium ion battery of 1000 mAh and the receiving inductor load current and circuit. Other parts include speaker, integrated microphone, call button, telephone, LCD screen. The collar has a USB socket which allows it be be easily recharged even without the power pack leash, it can be recharged anywhere, whether in a residential outlet or directly in the car or even from the USB port of a laptop or a charging source portable booster. Especially useful when moving or travelling. A single charge of the leash can recharge the collar up to 3 times.

2) A power pack electronic leash with retractable tether cord used to tie the animal and recharge the battery on the collar. The power pack leash, has a connector with inductive charging coil emitting a current through the connector housing and through the housing of the collar. The internal pulley of the leash is provided with a tension spring for automatically rewinding the cord on the pulley when the toggle unlocking arm is pressed. A slip ring installed at the center of the pulley allows the rotation action of the pulley without the wiring that supplies current to the retractable cord undergoing twisting. Some of the functions of the control circuit include lighting management of a safety light, energy management, and battery charging on both the leash and the collar. Managing wireless controls for operating the remote control of the buzzer on the collar. Also included are additional security lighting, USB charging jack, LED lights, micro chip, wireless transmit antenna to operate the remote collar of the vibrator motor.

3) A solar station with fixed external attachment for attaching the animal while charging the electronic collar so there is no need to remove the collar in order to charge its battery even if the dog is attached with a tether line to the solar station located in the backyard, for example.

For people who prefer to attach their pet outside, the solar station can be fixed anywhere like on a pole, a post, a ramp, etc since it requires no power cord. The solar panel is then directed to the sun thanks to its articulated arm connecting the solar panel to the station housing. A tether cord can be connected between the solar station and the collar using the induction coil technology, holding the animal while charging the battery in the collar. The solar panel charges the battery pack inside the station in about an hour of sunshine. The internal battery of the station can recharge the collar up to 3 times on a single charge.

The animal's tether from the station to the collar consists of; 1 stainless steel cable 0.07 mm 125 lbs test, one cable 12v 22AWG multi-core, covered with a braided Kevlar envelope.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiment of the invention.

BRIEF DESCRIPTION OF THE DRAWINGS

FIGS. 12-13 Exploded and isometric views of the socket.

DETAILED DESCRIPTION

Figure 1:
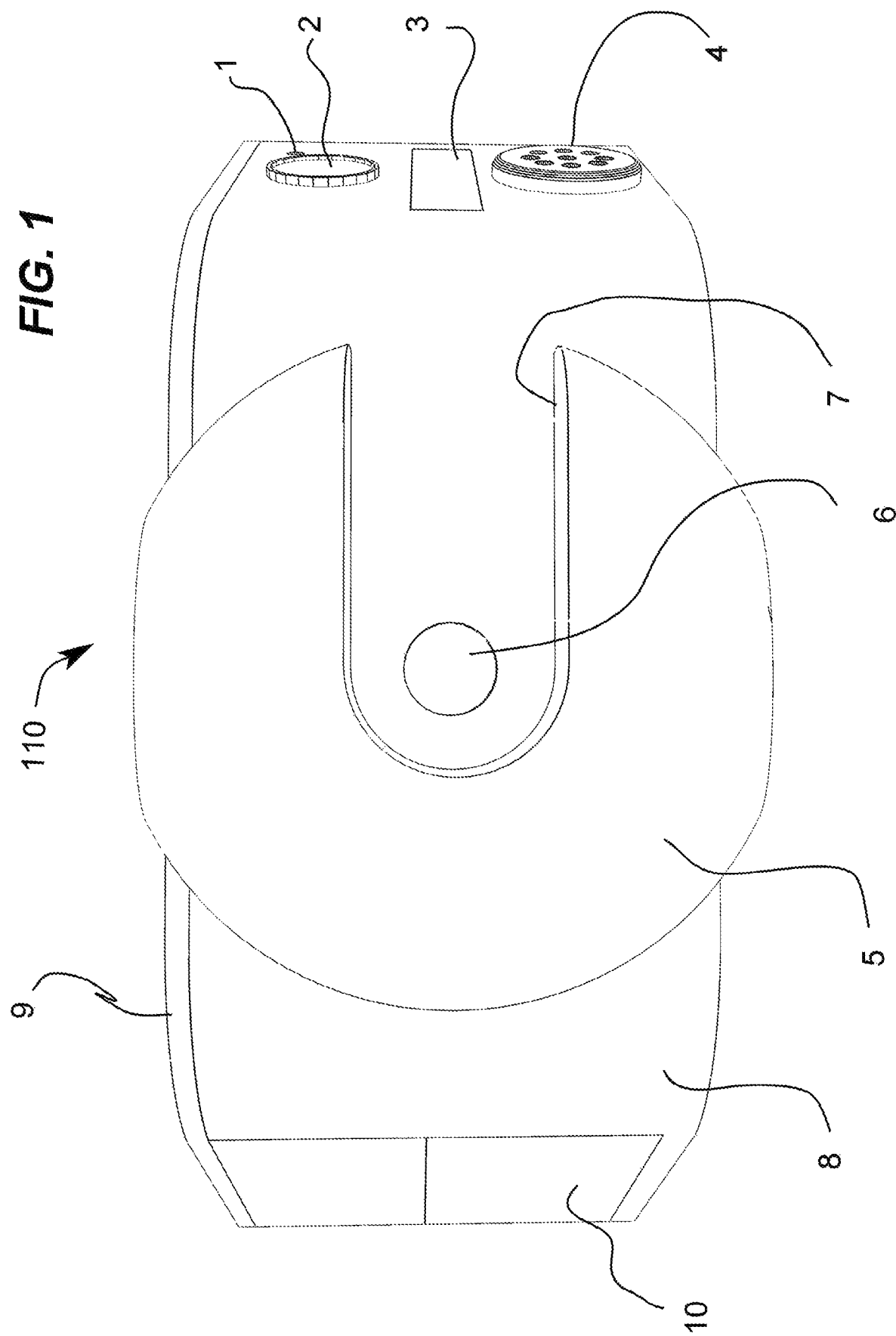
FIG. 1 Bottom view of the collar module.
Figure 2:
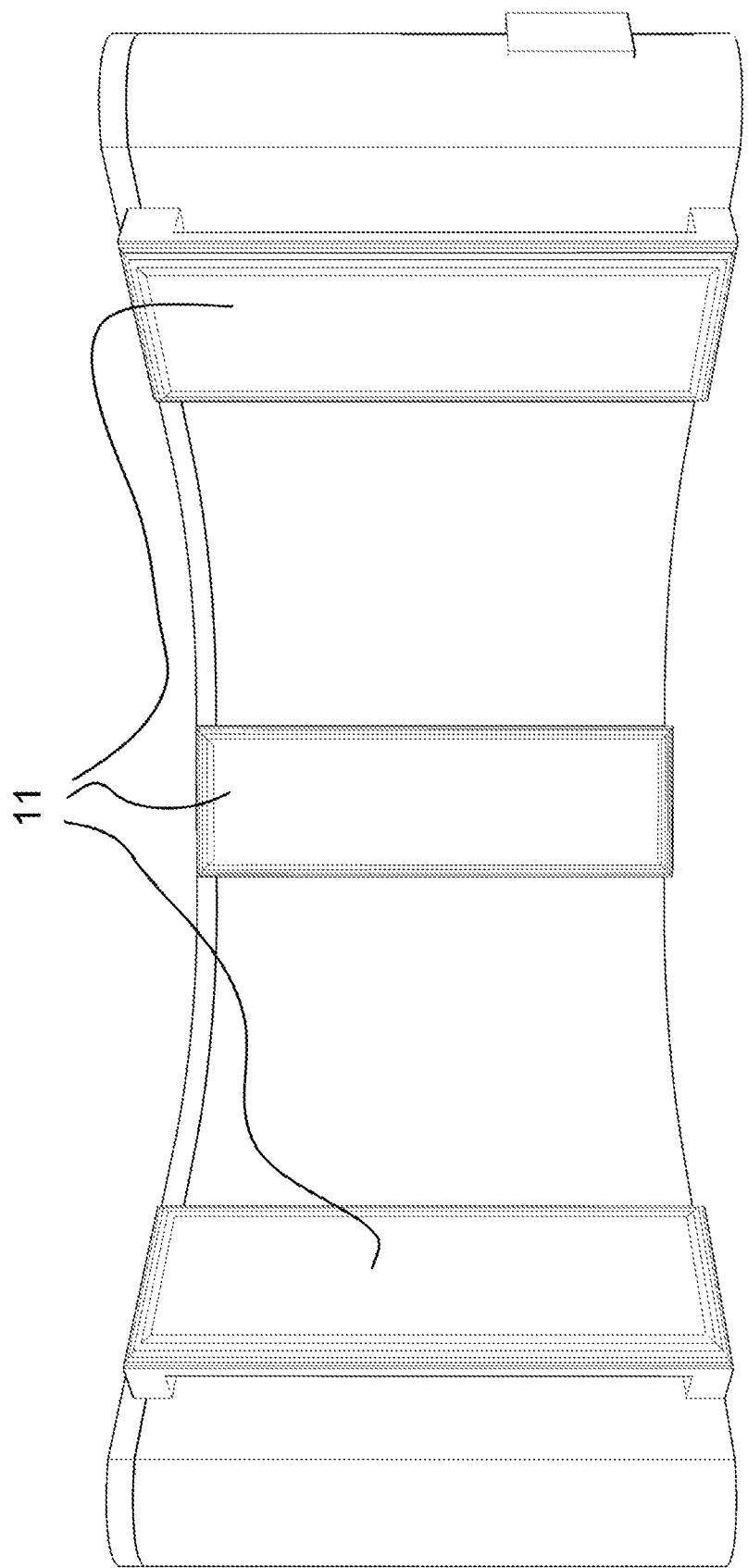
FIG. 2 Top view of the collar module.
Figure 3:
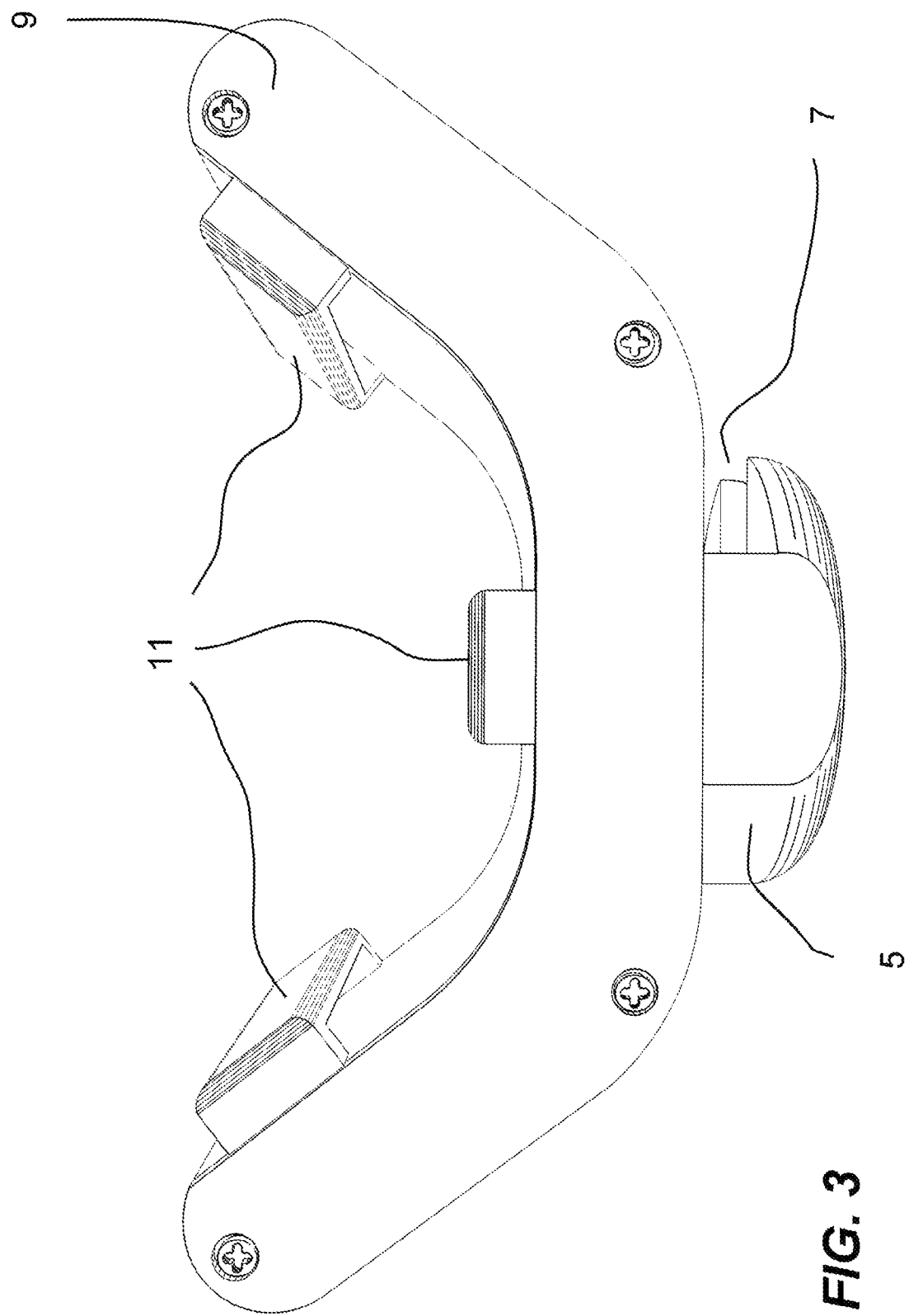
FIG. 3 Rear view of the collar module.
Figure 4:
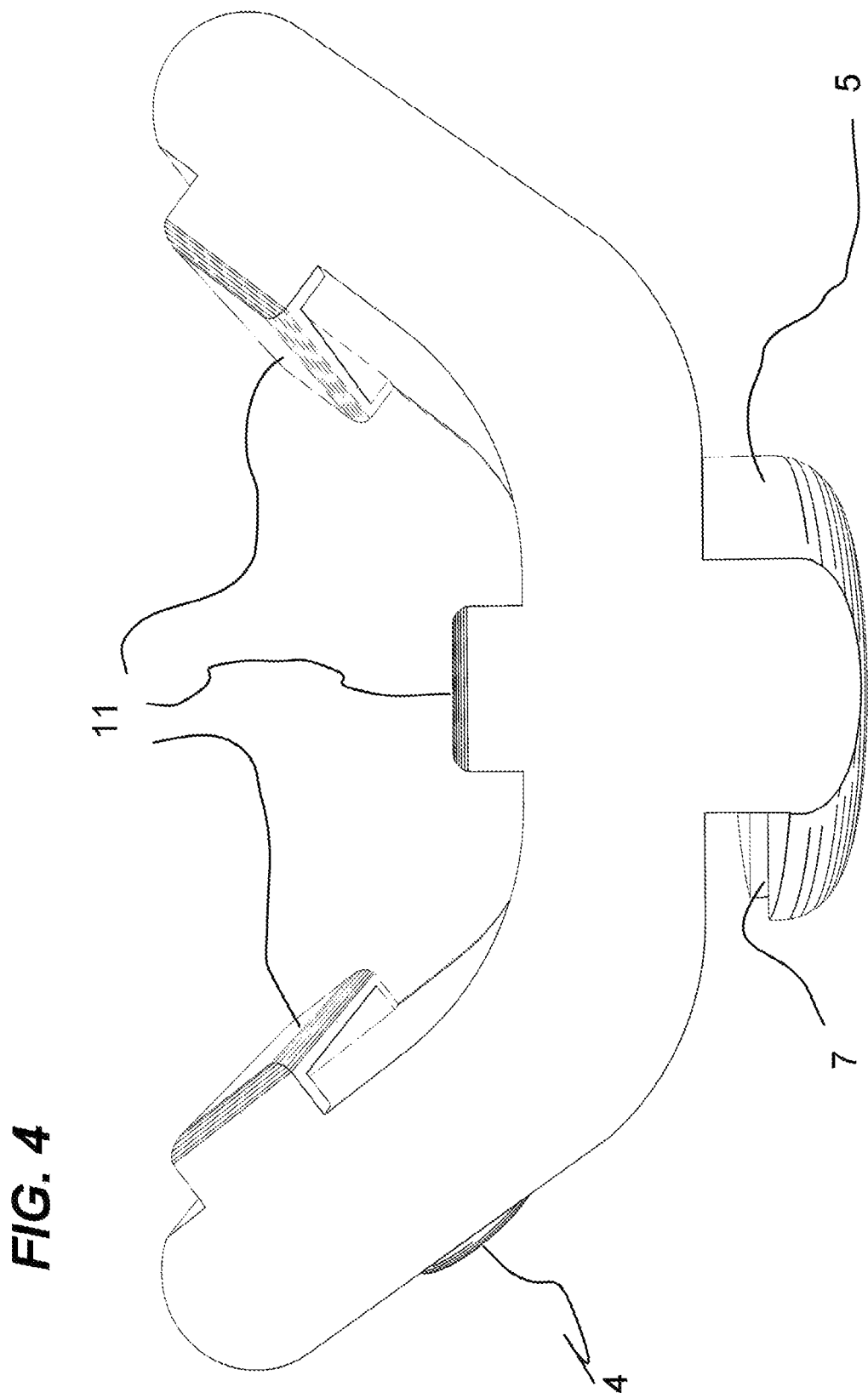
FIG. 4 Front view of the collar module.
Figure 5:
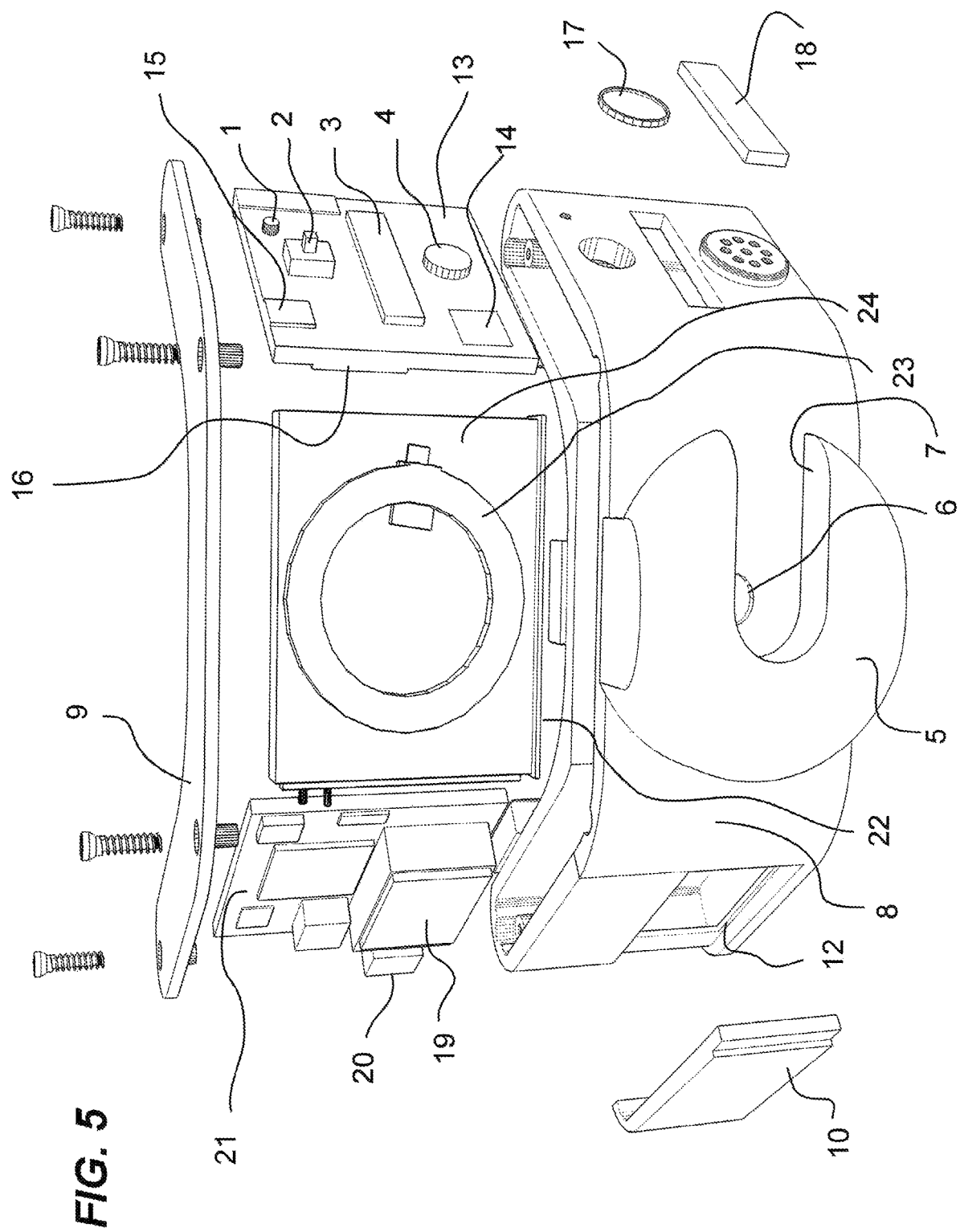
FIG. 5 Exploded view of the collar module.
Figure 6:
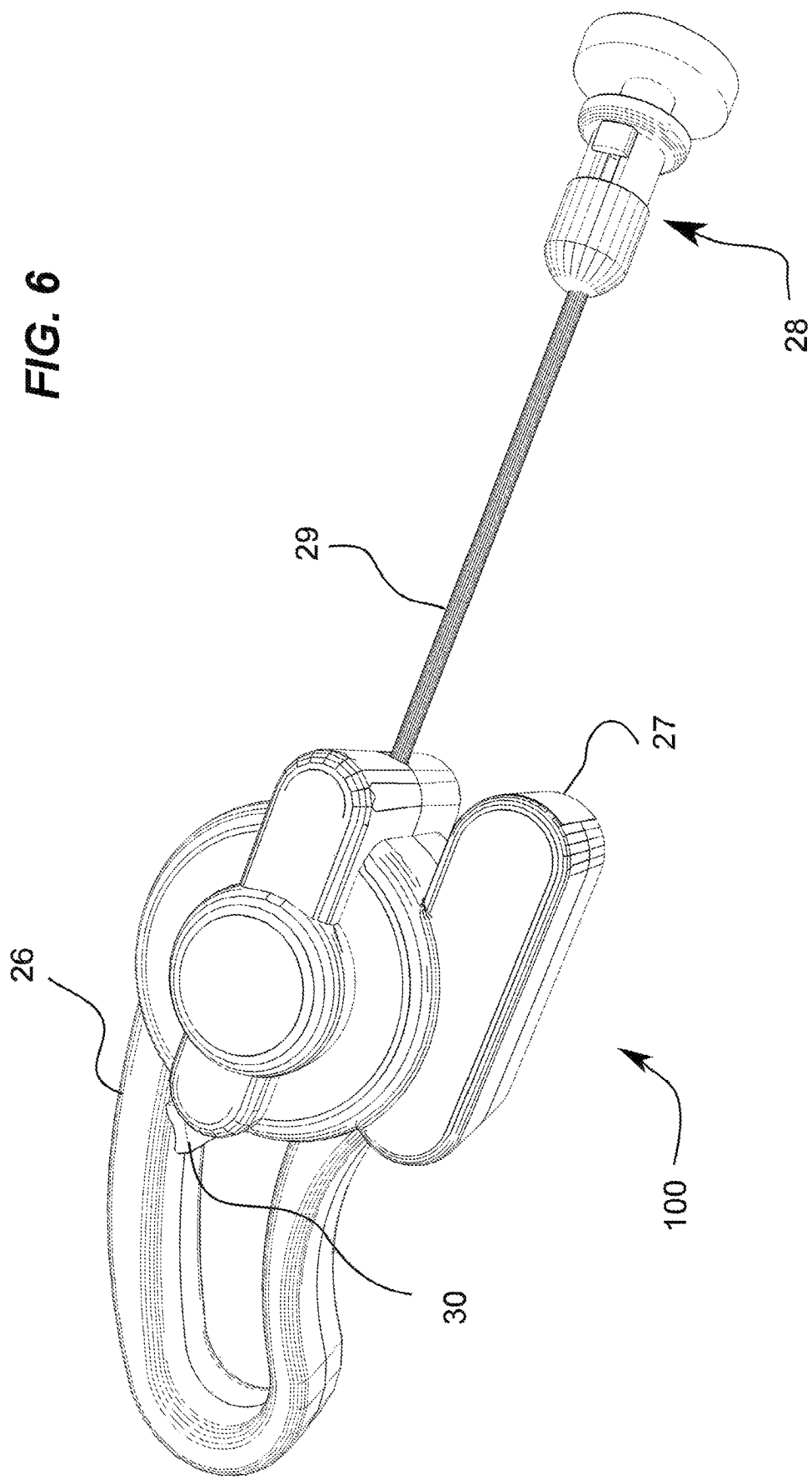
FIG. 6 Isometric view of the retractable leash.
Figure 7:
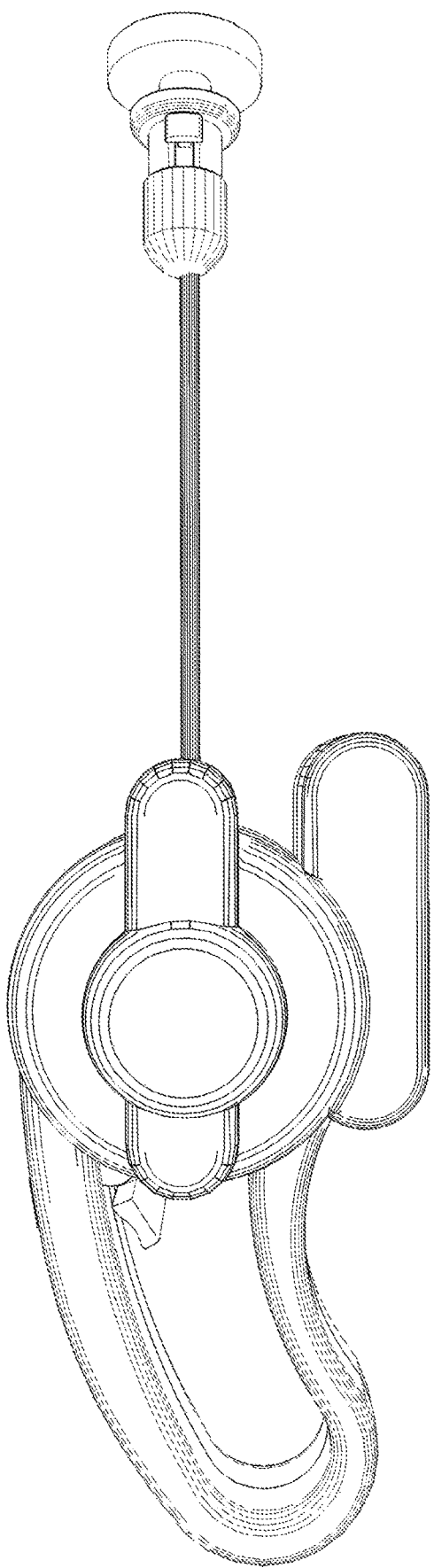
FIGS. 7-8 Views of both sides of the retractable leash.
Figure 8:
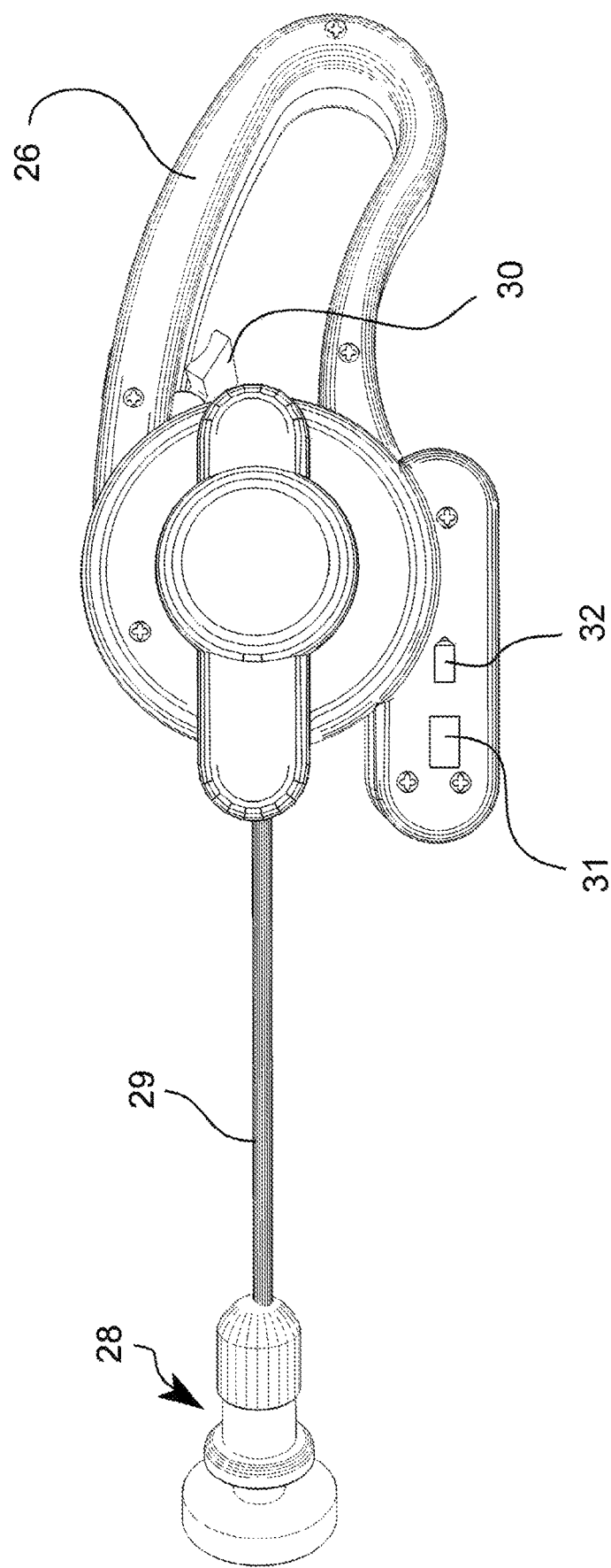
Figure 9:
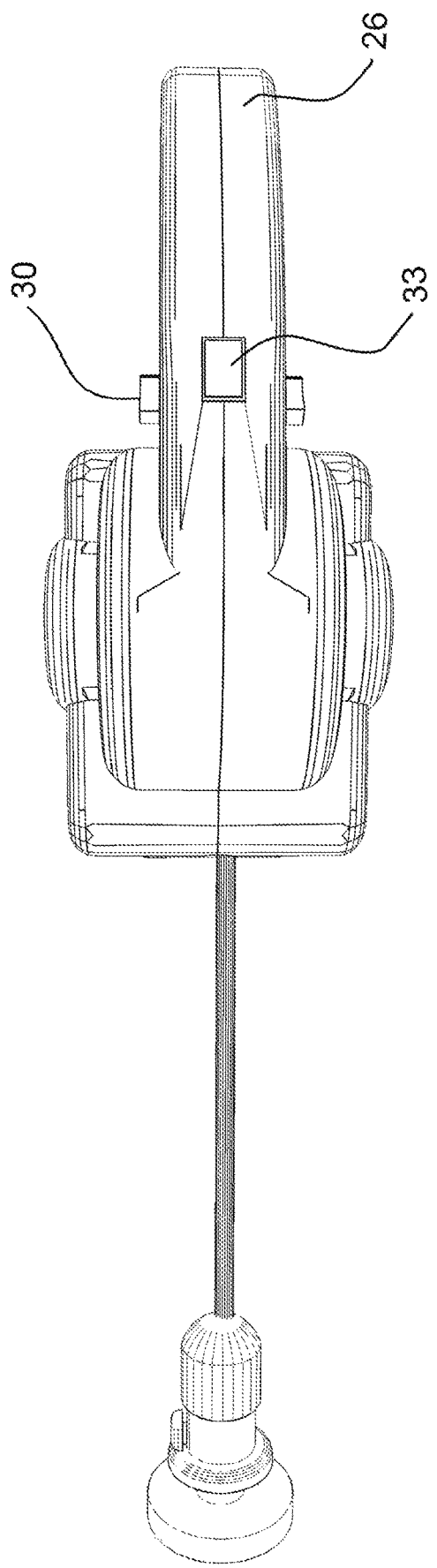
FIGS. 9-10 Top and bottom views of the retractable leash.
Figure 10:
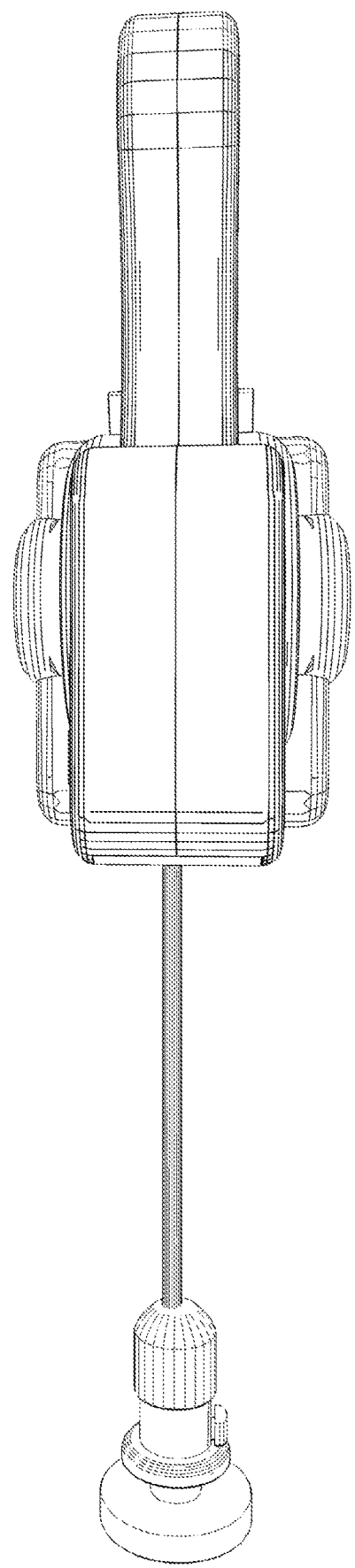
Figure 11:
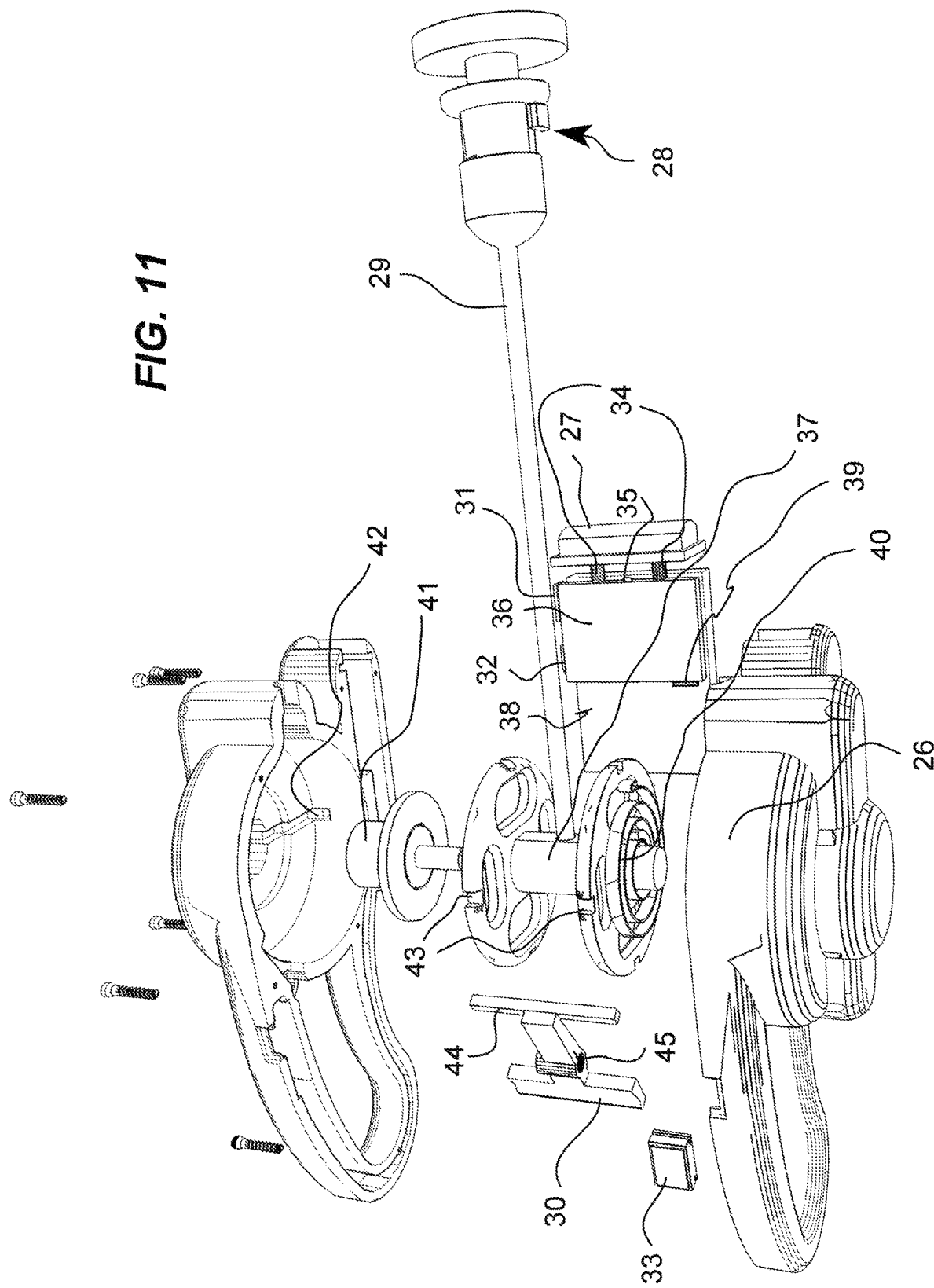
FIG. 11 Exploded view of the retractable leash.
Figure 14:
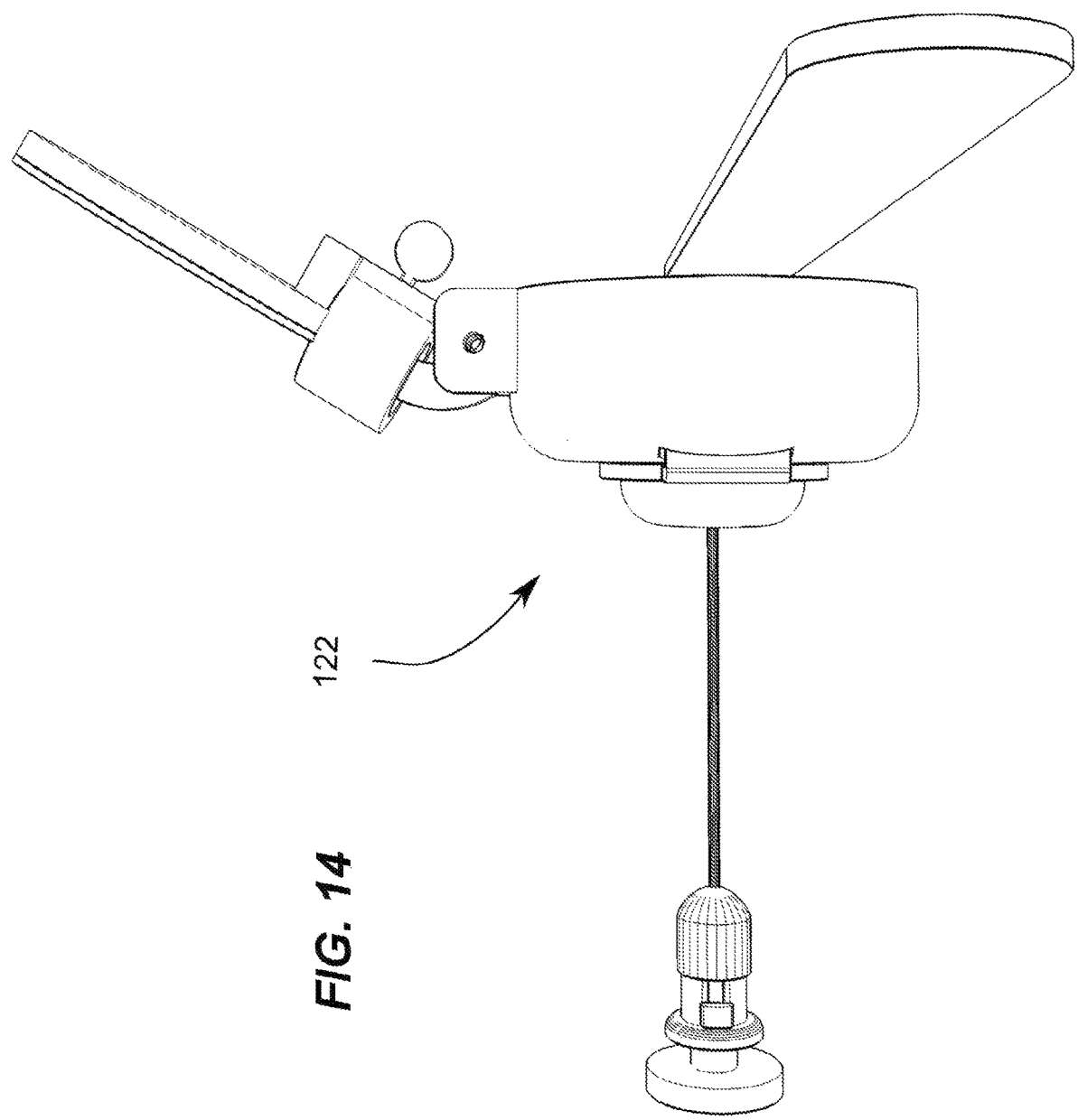
FIGS. 14-15 Views of both sides of the solar powered charging station.
Figure 15:
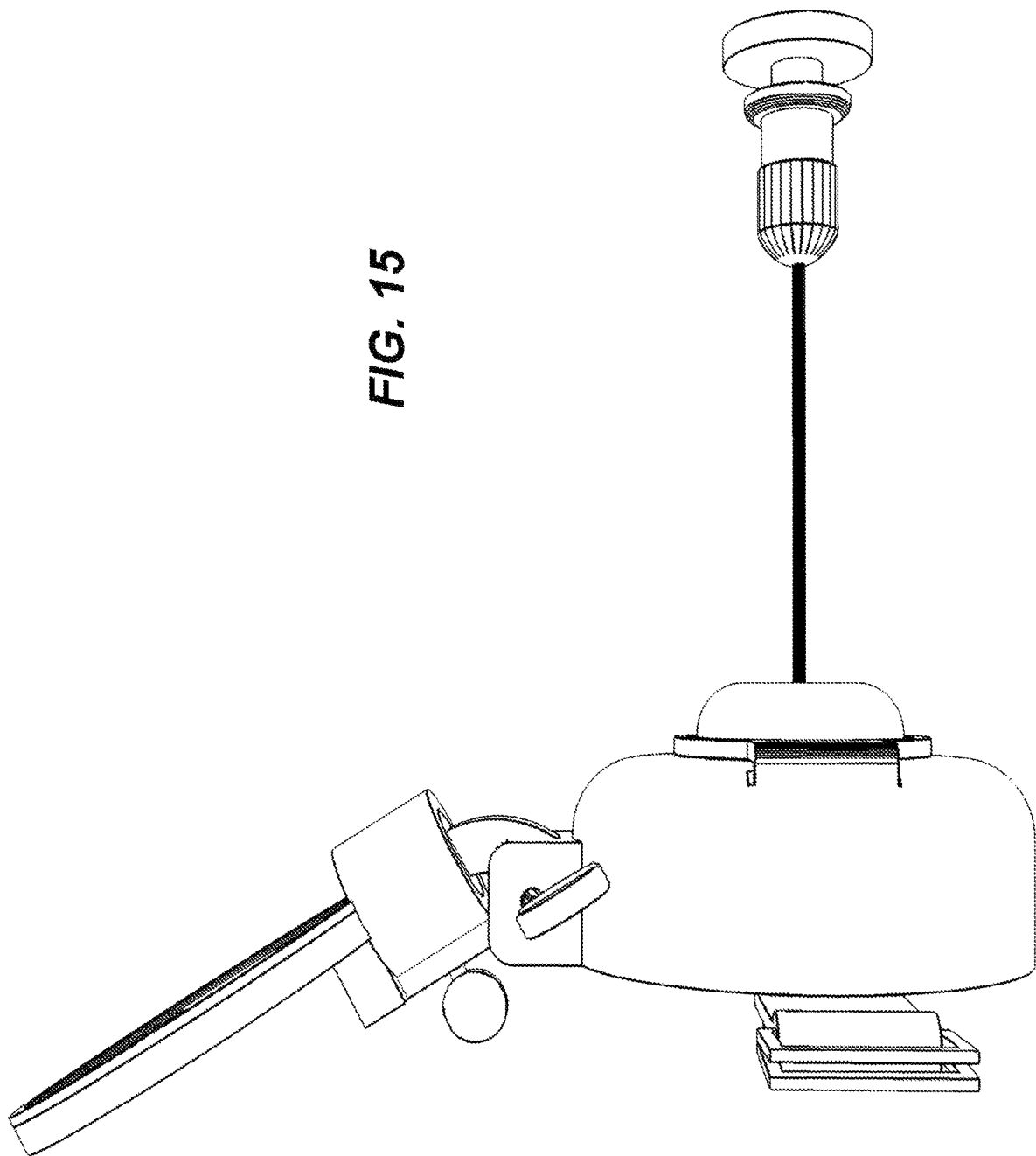
Figure 16:
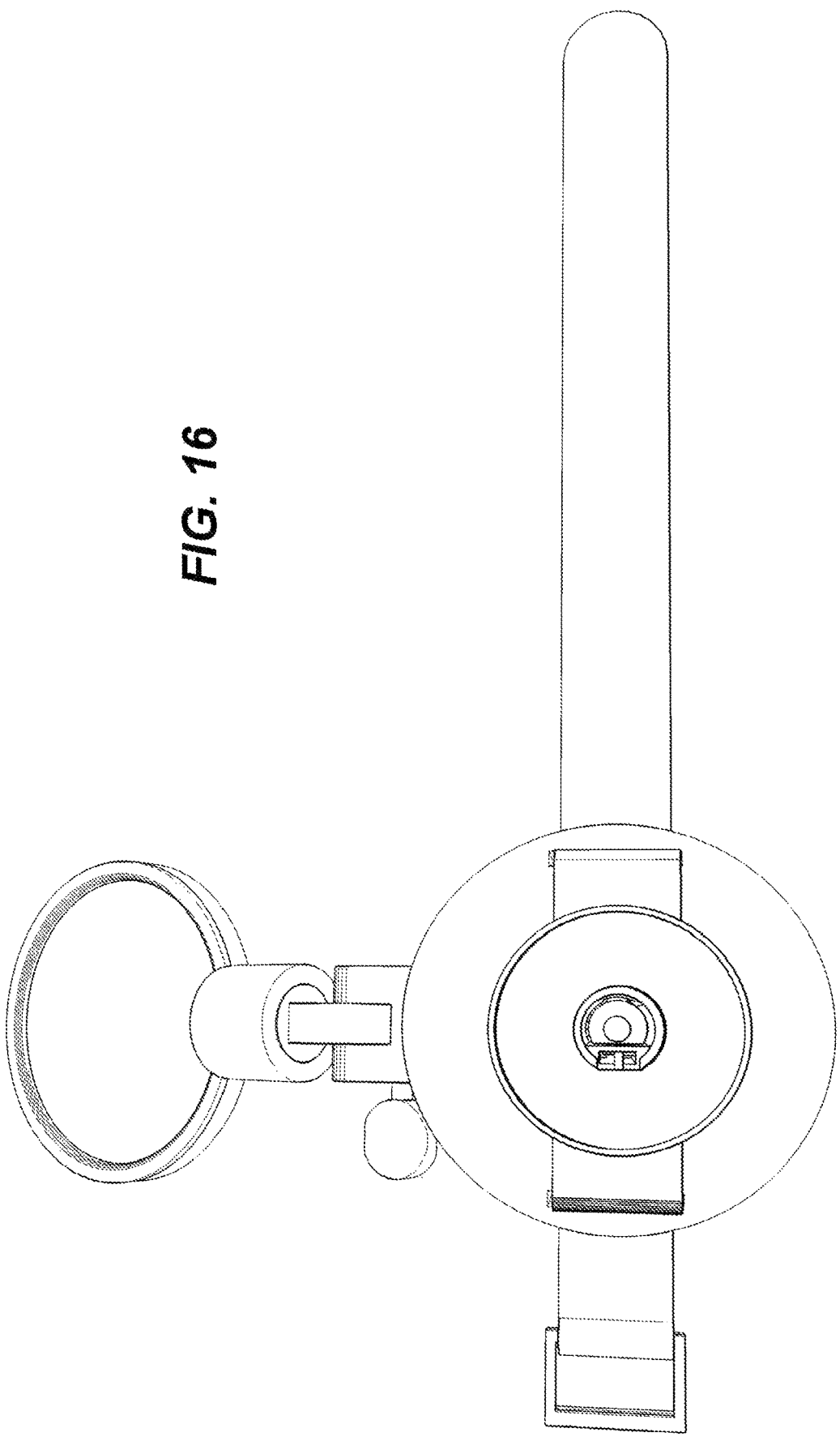
FIGS. 16-17 Front and rear views of the solar powered charging station.
Figure 17:
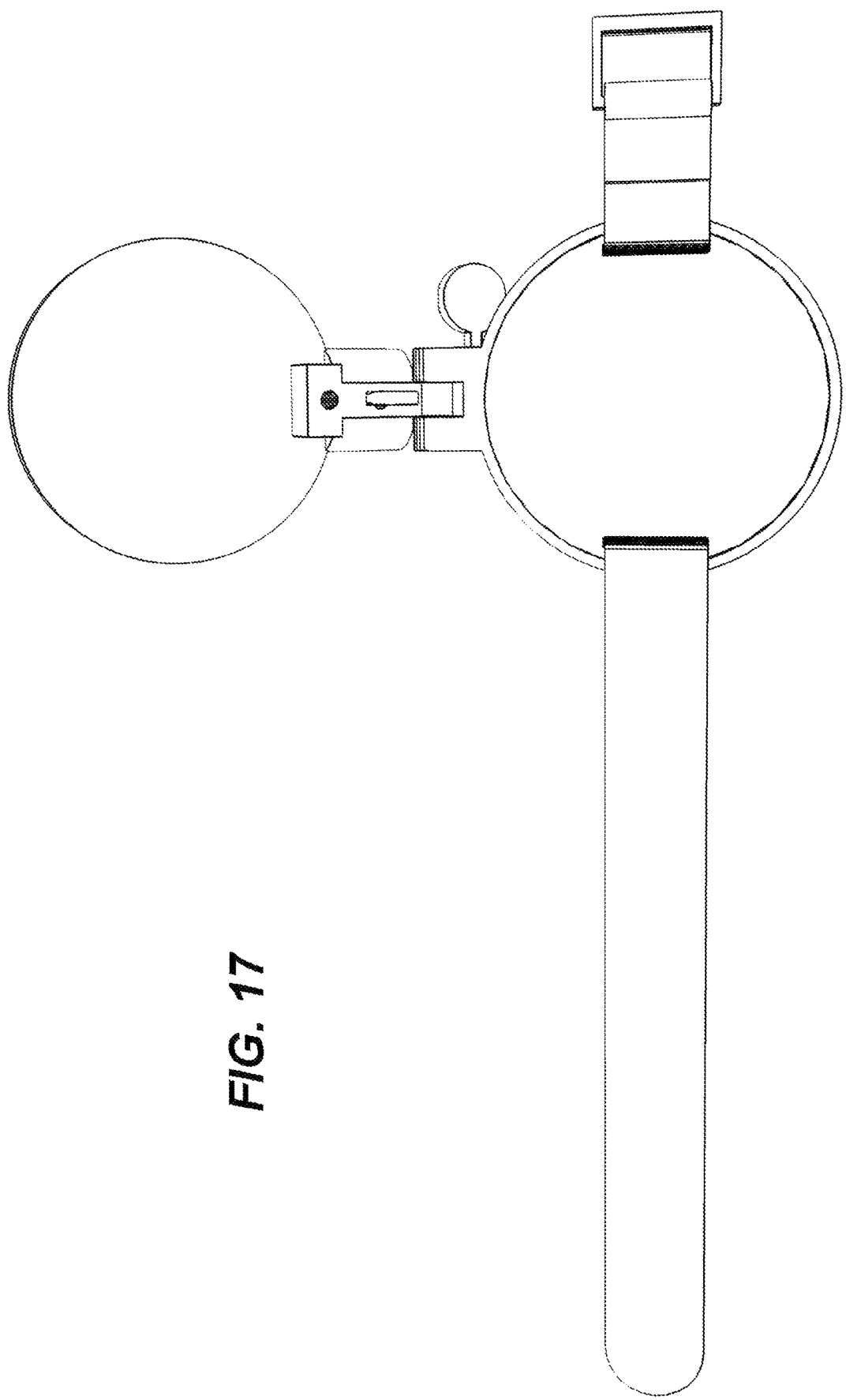

A combination of a retractable leash (100) and a collar module (110) with an outdoor solar powered charging station (122) is comprised of the following components:

More specifically in FIGS. 1-5, the collar module (110): Microphone (1), phone call button (2), LCD display (3), built-in miniature speaker (4). On the underside of the collar is located a leash socket connector (5), wherein a leash socket (28) connects into a pin cavity (6) of the socket connector (5) by sliding into a slit member (7). The pin cavity (6) is where the socket locking pin (51) is inserted when securing the leash line (29) to the collar module (110).

The collar module (110) has a casing (8), and a cover member (9). A lid member (10) to cover a slot for a SIM card base (19). A pair of loops (11) are configured for passing a collar strap (not shown). Shoulder members (12) are designed for receiving the lid member (10).

A controller PCB (13), a memory chip (14) used for storing useful information concerning the pet as well as automated vocal commands aimed at the pet. Miniature vibrator (15) which receives remote actuating signal from a receiving antenna (16).

A sealing plug (17) for the phone call button (2). transparent LCD display cover (18); SIM card base (19) mounted on top of a cellular/GPS PCB (21). A GPS antenna (20). a receiving induction coil and circuit (23) Rechargeable battery (24).

The electronic module (21) integrates cellular calling and GPS positioning. Thus, the owner can check at any time the position of the animal by using the dedicated mobile application. The control PCB (13) controls the integrated; LCD (3), speaker (4), Microphone (1), dial button (2), and vibrator (15). Also a memory chip (14) for a pre-recorded voice message giving instructions to whoever finds the animal. This voice message can be recorded in the memory of the collar directly with the collar using the functions of the phone call button or by using the functions of the dedicated mobile application. Thus, if the animal comes out of its authorized area, the command control circuit GPS positioning system sends an alert on the mobile phone of the owner. The collar vibrates and the pre-recorded message is played so the animal is motivated to come back closer to home, which results in the message and collar vibration to stop. The control circuit ensures that messages are displayed on the LCD (3) such as the animal's name, phone number, address etc. . . . If the animal is lost, a written message can appear on the LCD (3) asking for anyone who finds the animal to press on the call button to talk directly to the owner via the phone functions.

More specifically in FIGS. 6, 8, 9, 11 the retractable leash: Casing (26), light source (27), leash line (29), leash line lock/release button (30), sealed light source ON/OFF switch button (31), sealed USB port cover (32), sealed vibrating signal button (33) for sending a remote signal to the vibrator (15).

LED lights (34), two color LED battery charge indicator (35), leash control and management PCB (36), leash line reel (37), tension spring (40) for reeling the reel (37), rechargeable battery (38), emitter chip (39) for sending signal to vibrator (15). Slip ring (41) to electrically connect components to eliminate the use of cable at this location since they would tangle. Cable pathway (42) moulded inside the casing (26) to allow passage of cables. Locking notch (43) cooperating with a toggle pin (44) so a s to lock the reel (37). The toggle pin (44) has a toggle spring (45) to control the toggling action from reel locking to reel unlocking.

More specifically in FIGS. 12-13, the leash socket (28): Socket base cover (46), emitting induction coil (47) for providing charging current. Socket emitter circuit (48) for the emitting induction coil (47). Cavity (49) for stowing the socket emitter circuit (48) and passing the emitter circuit wires (112). Core connector (50) having a channel (114) for receiving a push button (52) which controls the movement of a socket locking pin (51). The core connector (50) also allows for the passage of the emitter circuit wires (112) which are soldered with leash line wires (116) located just in front of a retaining bulge (120) that is used for retaining the end of the leash line (29 inside of a connector cap (54) which threads onto the core connector (50). Both the leash line wires (116) and the emitter circuit wires (112) are also located inside the connector cap (54). The push button (52) has a push button spring (53) which actuates the socket locking pin (51). The leash socket (28) connects with the collar module (110) by inserting its peripheral section (118) through the slit member (7) of the socket connector (5), The inside of the socket connector (5) is shaped so that the peripheral section (118) fits in perfectly inside. In order to prevent the leash socket (28) from sliding out of the socket connector (5), the socket locking pin (51) is automatically pushed into the pin cavity (6) by way of the push button spring (53) as soon as the leash socket (28) and its peripheral section (118) are inserted into the socket connector (5). Pulling on the push button (52) disengages the locking pin (51) from the pin cavity (6) and the leash socket can be released from the socket connector (5) by sliding it out of the slit member (7).

Figure 18:
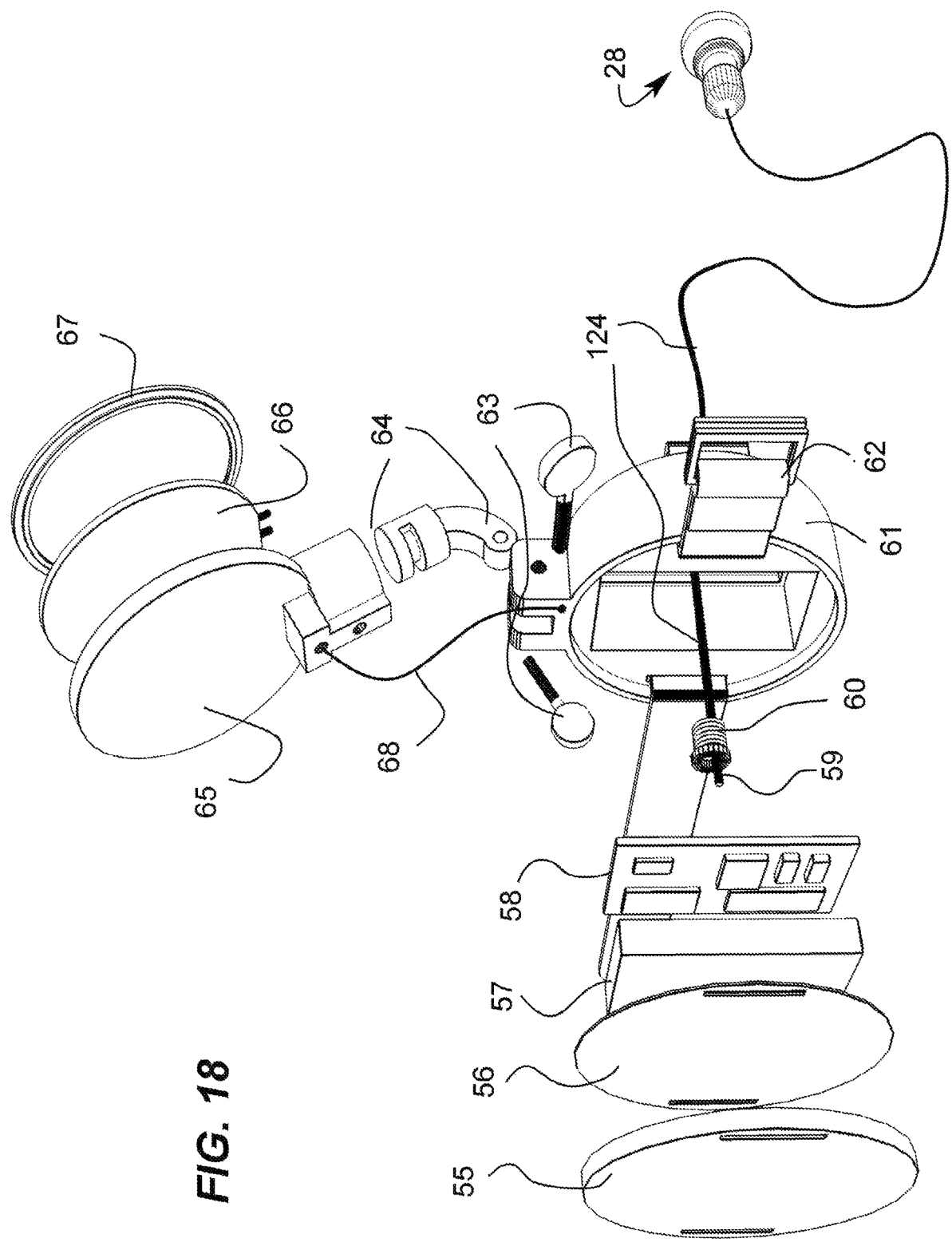
FIG. 18 Explode view of the solar powered charging station.
Figure 19:
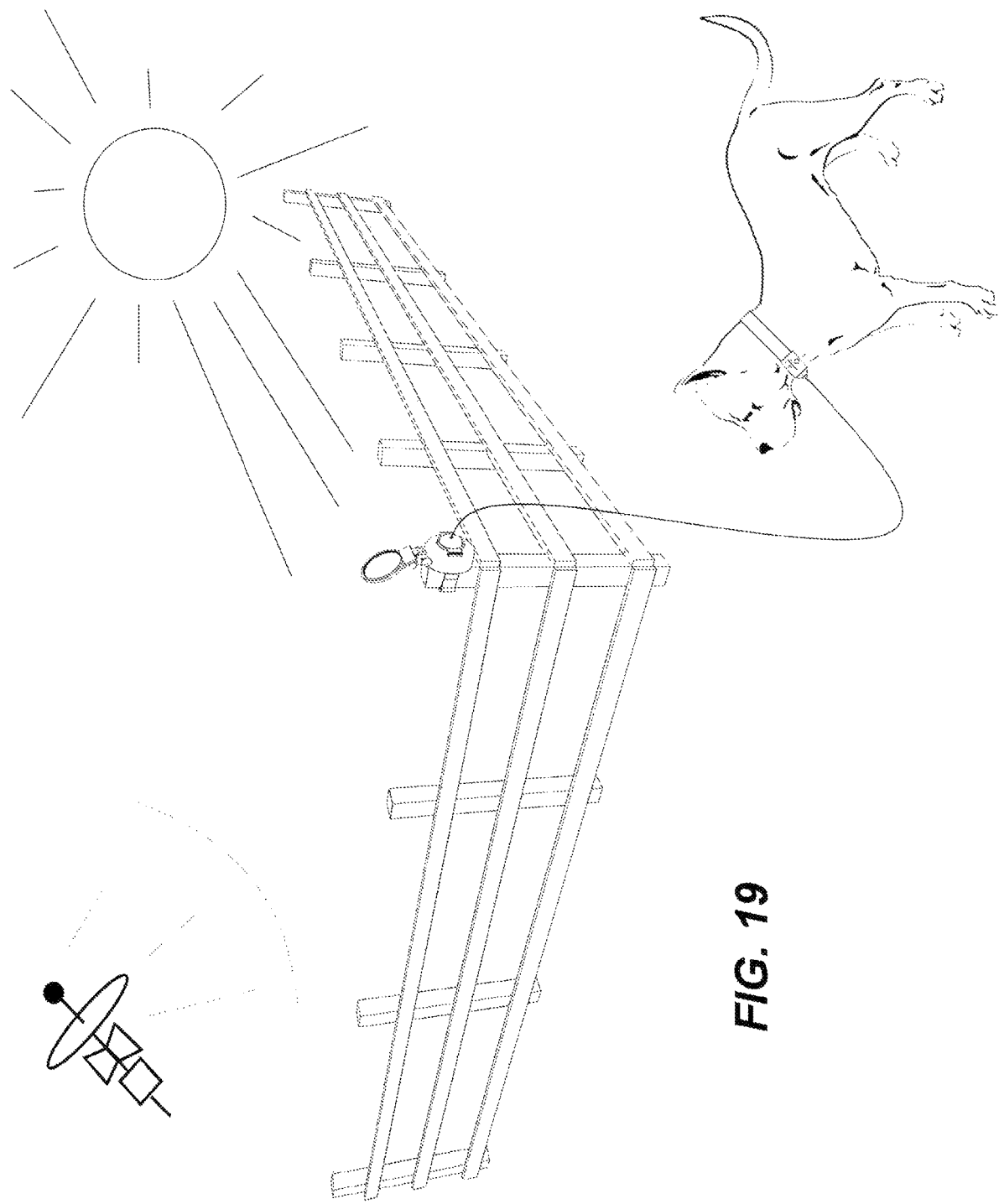
FIG. 19 Isometric view of the invention in context of use.

More specifically in FIG. 18, the solar powered charging station (122): Rear cover (55), seal (56), station rechargeable lithium battery (57), station charging management PCB (58). Combination anti shock spring (60) and metal ring (59) to retain a tether line (124). Charging station casing (61). Tying strap (62), butterfly screws (63) to tighten an articulated joint (64) used for aligning a pivoting head (65) onto which is placed a solar panel (66) and a retaining frame (67) to hold the solar panel (66) in place. A cable (68) connects the solar panel (66) to the station charging management PCB (58).

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A connector line in combination with a tether line comprising:
   an induction coil to transmit electrical power from said tether onto an induction coil receiver located on a dog collar;
   wherein said connector line has a distal end terminated with a socket configured and sized for fitting into a socket connector; said socket comprising said induction coil and socket connector therein and said collar comprising said induction coil receiver thereon;
   wherein when said socket is connected to said socket connector, both said induction coil and said induction coil receiver are positioned proximal to one another so that electrical current can be induced between said induction coil and said induction coil receiver and so that electricity from said tether line can charge a battery located on said collar;
   said socket has a socket base cover;
   a socket emitter circuit for said induction coil;
   a cavity for stowing said socket emitter circuit and passing emitter circuit wires;
   a core connector having a channel housing a push button;
   said push button controlling the movement of a socket locking pin;
   wherein said core connector allows for the passage of said emitter circuit wires;
   wherein said emitter circuit wires are soldered with leash line wires located just in front of a retaining bulge;
   wherein said retaining bulge is used for retaining the end of said leash line wires inside of a connector cap;
   wherein said connector cap threads onto said core connector;
   wherein both said leash line wires and said emitter circuit wires are also located inside said connector cap;
   wherein said push button has a push button spring that actuates said socket locking pin;
   wherein said socket connects with said collar by inserting a peripheral section of said socket through a slit member of said socket connector;
   said socket connector further comprising an inside area shaped so that said peripheral section of said socket fits in perfectly inside in order to prevent said socket from sliding out of said socket connector,
   wherein said socket locking pin is automatically pushed into a pin cavity by way of said push button spring as soon as said socket and said peripheral section of said socket are inserted into said socket connector;
   wherein pulling on said push button disengages said locking pin from said pin cavity and said leash socket can be released from said socket connector by sliding it out of said slit member.

* * * * *